(12) United States Patent
Lee et al.

(10) Patent No.: US 9,483,116 B2
(45) Date of Patent: Nov. 1, 2016

(54) METHOD, DEVICE, AND SYSTEM FOR PROVIDING SENSORY INFORMATION AND SENSE

(71) Applicant: Samsung Electronics Co., Ltd., Gyeonggi-do (KR)

(72) Inventors: Moon-joo Lee, Gyeonggi-do (KR); Jun-ho Koh, Gyeonggi-do (KR); Yang-un Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 135 days.

(21) Appl. No.: 14/319,912

(22) Filed: Jun. 30, 2014

(65) Prior Publication Data

US 2014/0359437 A1 Dec. 4, 2014

Related U.S. Application Data

(63) Continuation of application No. 13/329,962, filed on Dec. 19, 2011, now Pat. No. 8,766,785.

(30) Foreign Application Priority Data

Dec. 21, 2010 (KR) ........................ 10-2010-0131661

(51) Int. Cl.
*G06F 3/01* (2006.01)
*G06F 3/038* (2013.01)
*G06F 3/048* (2013.01)
*G06F 3/0346* (2013.01)
*G08B 6/00* (2006.01)
*G06F 3/0484* (2013.01)

(52) U.S. Cl.
CPC .............. *G06F 3/014* (2013.01); *G06F 3/011* (2013.01); *G06F 3/013* (2013.01); *G06F 3/016* (2013.01); *G06F 3/038* (2013.01); *G06F 3/0346* (2013.01); *G06F 3/048* (2013.01); *G06F 3/04842* (2013.01); *G08B 6/00* (2013.01)

(58) Field of Classification Search
CPC ......... G08B 6/00; G06F 3/016; G06F 3/011; G06F 3/0346; G06T 19/20
USPC ......... 340/407.1; 345/156–158, 419; 463/37; 715/757, 702
See application file for complete search history.

(56) References Cited

U.S. PATENT DOCUMENTS

| 7,161,579 B2 | 1/2007 | Daniel |
| 7,843,429 B2 | 11/2010 | Pryor |
| 8,766,785 B2 * | 7/2014 | Lee et al. .................. 340/407.1 |
| 2002/0036617 A1 | 3/2002 | Pryor |

(Continued)

FOREIGN PATENT DOCUMENTS

| JP | 2002-366271 | 12/2002 |
| JP | 2005-537596 | 12/2005 |

(Continued)

OTHER PUBLICATIONS

European Search Report dated Aug. 25, 2016 issued in counterpart application No. 11851008.0/1959, 9 pages.

*Primary Examiner* — John A Tweel, Jr.
(74) *Attorney, Agent, or Firm* — The Farrell Law Firm, P.C.

(57) ABSTRACT

Provided is a method, a device, and a system, in which a sensor of a sense-providing device senses a motion of the sense-providing device, without using a plurality of cameras, to detect an object and provide sensory information.

18 Claims, 5 Drawing Sheets

(56) References Cited

U.S. PATENT DOCUMENTS

| | | |
|---|---|---|
| 2003/0234823 A1 | 12/2003 | Sato et al. |
| 2005/0285844 A1 | 12/2005 | Morita et al. |
| 2005/0285853 A1 | 12/2005 | Morita et al. |
| 2007/0091063 A1 | 4/2007 | Nakamura et al. |
| 2008/0068336 A1 | 3/2008 | Choi et al. |
| 2010/0306715 A1 | 12/2010 | Geisner et al. |

FOREIGN PATENT DOCUMENTS

| | | |
|---|---|---|
| KR | 1020050065197 | 6/2005 |
| KR | 1020080026002 | 3/2008 |

* cited by examiner

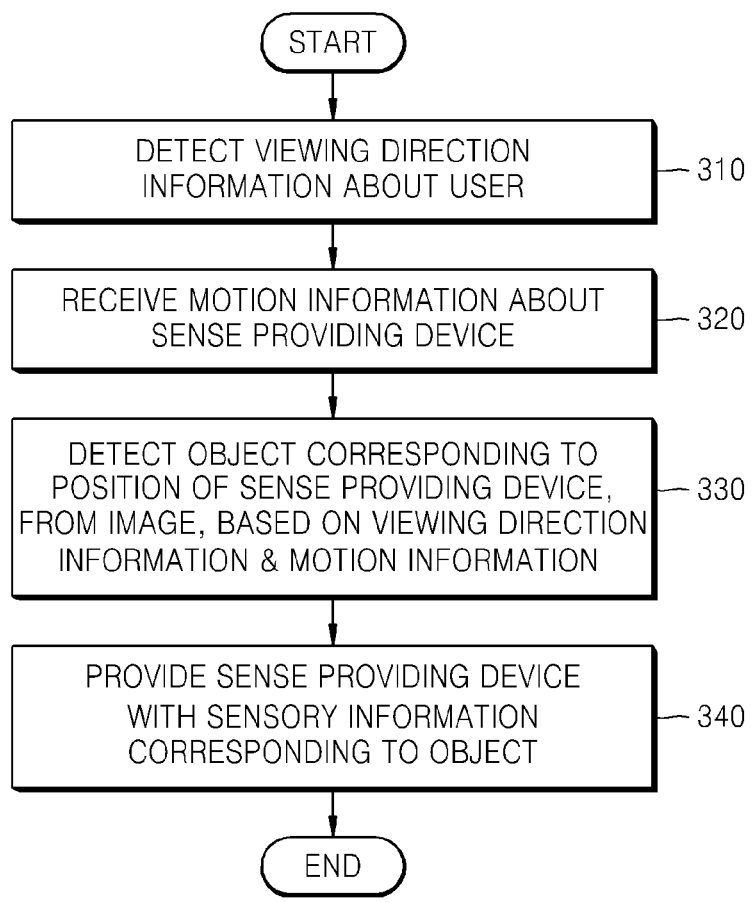

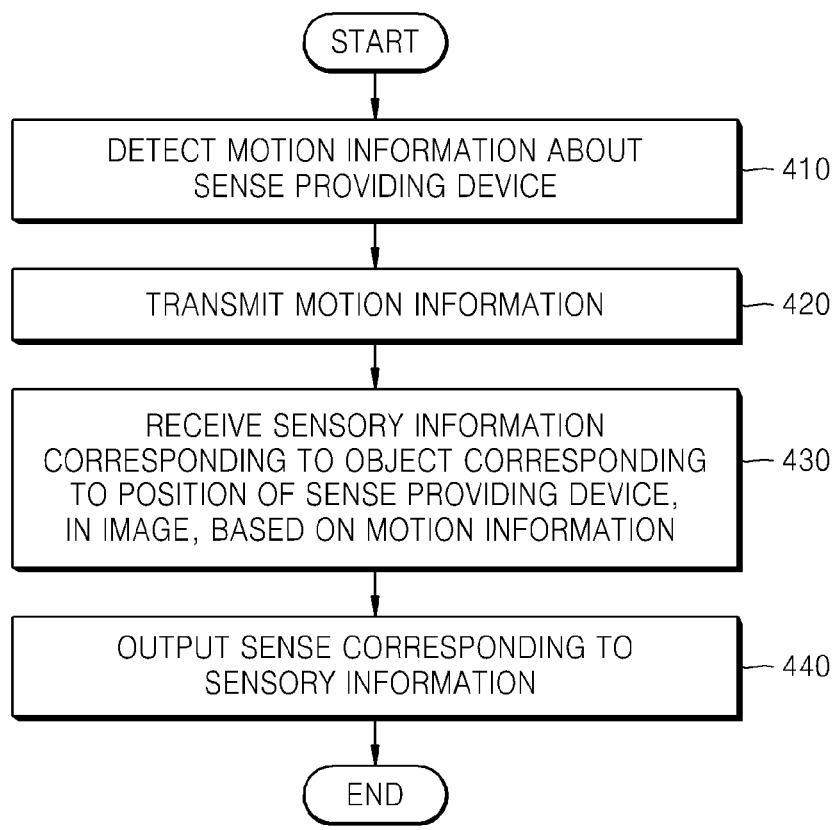

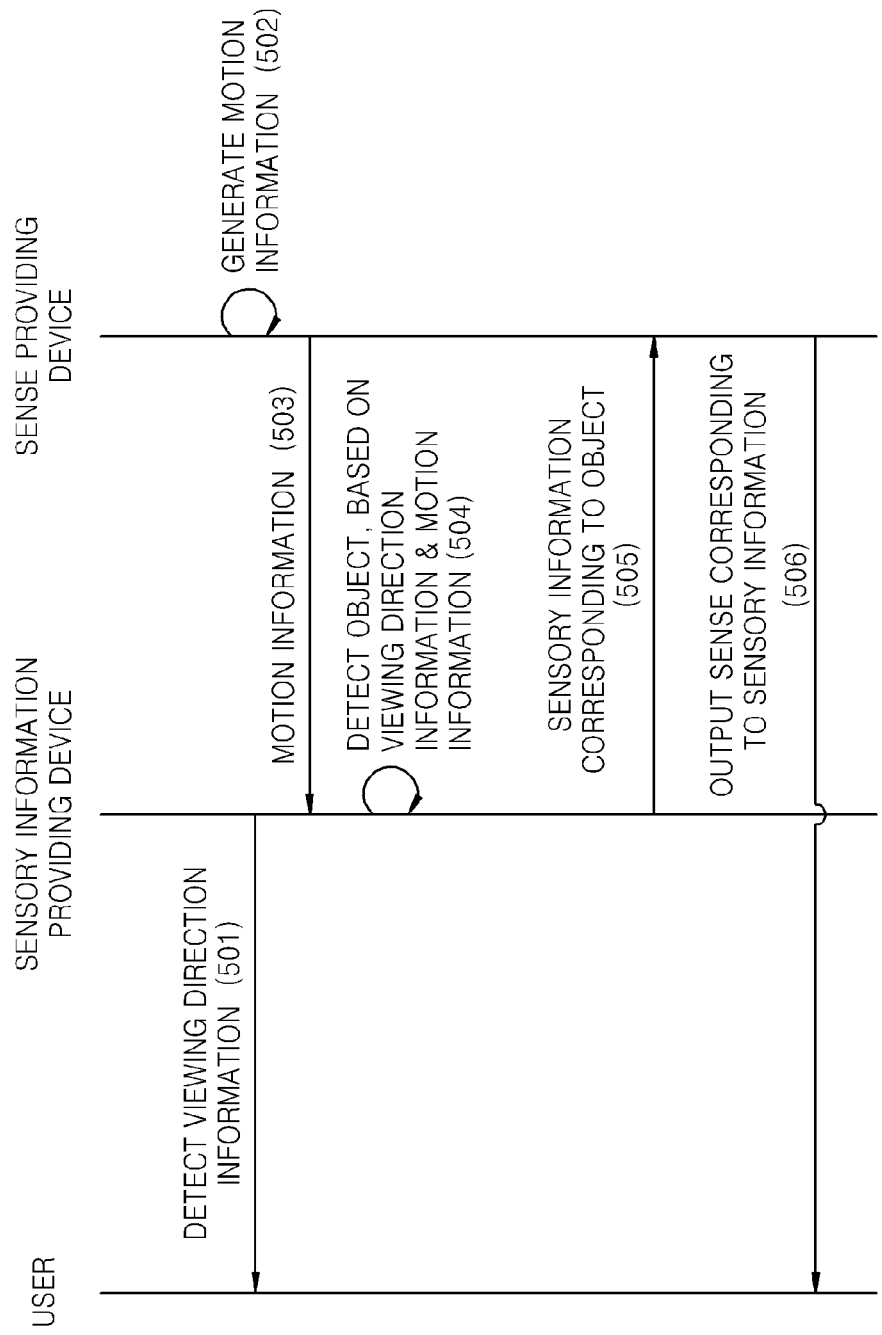

METHOD, DEVICE, AND SYSTEM FOR PROVIDING SENSORY INFORMATION AND SENSE

PRIORITY

This application is a Continuation Application of U.S. application Ser. No. 13/329,962 which was filed in the U.S. Patent and Trademark Office on Dec. 19, 2011 and claims priority under 35 U.S.C. §119(a) to Korean Patent Application No. 10-2010-0131661, filed on Dec. 21, 2010, in the Korean Intellectual Property Office, the contents of which are incorporated herein by reference.

BACKGROUND OF THE INVENTION

1. Field of the Invention

The present invention relates generally to a method, a device, and a system for providing sensory information and a sense, and more particularly, to a method, a device, and a system for detecting an object, based on information about a motion of a sense-providing device using a 4-dimensional (4D) technology, and providing a user with a sense corresponding to the object.

2. Description of the Related Art

It is known in the art to provide a plurality of cameras installed on a television, for detecting a tactile sense-providing device installed on fingers of a user, so as to determine whether the user touches a certain object on a screen of the television. Tactile information corresponding to the object on the screen is transmitted to the tactile sense-providing device installed on the fingers, so that the user can feel the object.

SUMMARY

The present invention has been made to solve at least the above-described problems and disadvantages in the conventional art, and to provide at least the advantages described below.

Accordingly, an aspect of the present invention is to provide a method, a device, and a system, in which a sensor of a sense-providing device senses a motion of the sense-providing device, without using a plurality of cameras, to detect an object and provide sensory information.

In accordance with an aspect of the present invention, a sensory information-providing method is provided. The method includes detecting viewing direction information about a viewing direction of a user, detecting, from an image, an object based on the viewing direction information, and providing a sense-providing device with sensory information representing at least one property of the detected object.

In accordance with another aspect of the present invention, a sensory information-providing device is provided. The device includes a viewing direction information detector configured to detect viewing direction information about a viewing direction of a user, an object detector configured to detect, from an image, an object based on the viewing direction information, a storage configured to store sensory information representing at least one property of the object, and a sensory information provider configured to provide the sensory information from the storage to the sense-providing device.

In accordance with another aspect of the present invention, a sense-providing method is provided. The method includes generating motion information about a motion of a sense-providing device, transmitting the generated motion information to a sensory information-providing device, receiving sensory information representing at least one property of an object detected, based on the motion information, and outputting a sense corresponding to the received sensory information.

In accordance with another aspect of the present invention, a sense-providing system is provided. The system comprises a sensory information-providing device and a sense providing device. The sensory information providing device includes a viewing direction information detector configured to detect viewing direction information about a viewing direction of a user, an object detector configured to detect, from an image, an object corresponding to a position of a sense-providing device, based on the viewing direction information, a storage configured to store sensory information representing at least one property of the detected object, and a sensory information provider configured to provide the sensory information from the storage to the sense-providing device. The sense-providing device includes a receiver configured to receive the sensory information, based on the viewing direction information, and a sense output device configured to output a sense corresponding to the sensory information.

In accordance with another aspect of the present invention, a non-transitory computer readable recording medium having recorded thereon a computer program for executing a sensory-information providing method is provided. The steps of the method include detecting viewing direction information about a viewing direction of a user, detecting, from an image, an object based on the viewing direction information, and providing a sense-providing device with sensory information representing at least one property of the detected object.

In accordance with another aspect of the present invention, a non-transitory computer readable recording medium having recorded thereon a computer program for executing a sense-providing method is provided. The steps of the method include generating motion information about a motion of a sense-providing device, transmitting the motion information to a sensory information-providing device, receiving sensory information representing at least one property of an object detected based on the motion information, and outputting a sense corresponding to the received sensory information.

BRIEF DESCRIPTION OF THE DRAWINGS

The above and other features and advantages of the present invention will become more apparent by describing, in detail, embodiments thereof with reference to the attached drawings in which:

FIG. 3 illustrates a sensory information-providing method according to an embodiment of the present invention;

FIG. 4 illustrates a sense-providing method according to an embodiment of the present invention; and FIG. 5 illustrates a method of receiving sensory information from a sensory information-providing device and providing a sense from a sense-providing device, according to an embodiment of the present invention.

DETAILED DESCRIPTION OF EMBODIMENTS OF THE PRESENT INVENTION

Reference will now be made in detail to embodiments of the present invention with reference to the accompanying drawings. In addition, a detailed description of generally known functions and structures of the present invention will be omitted for the sake of clarity and conciseness.

A 4-D technology provides a user with stimuli such as physical effects, as well as stereoscopic 3-dimensional (3-D) images and sounds, so that the user can receive realistic impressions. Alternatively, the 4D technology can be achieved by adding physical effects to a 2-dimensional (2-D) image. Physical effects may be obtained using air, vibration, motion control, water, smell, and light. According to an embodiment of the present invention, a display device provides 3D images and tactile stimuli, but the present invention is not limited thereto.

Figure 1A:
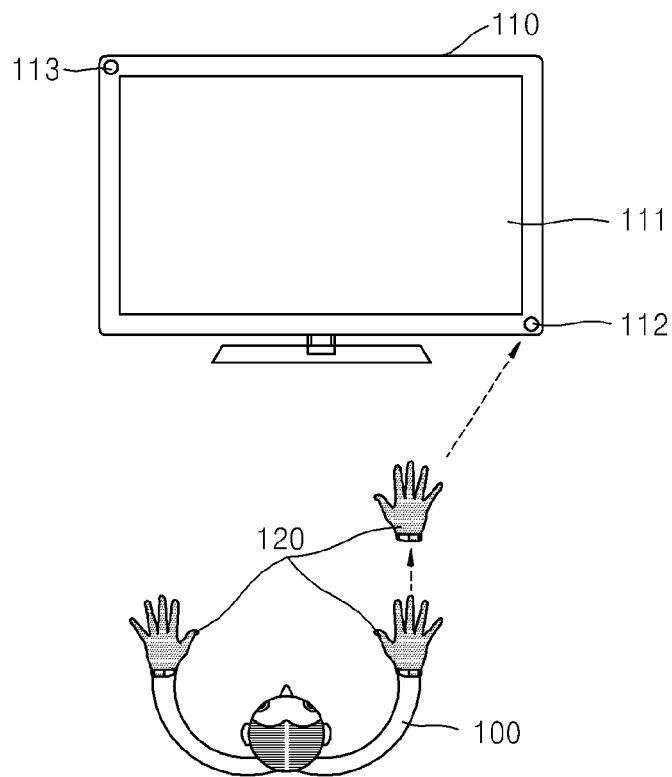
FIGS. 1A and 1B illustrate a sense-providing system according to an embodiment of the present invention.
Figure 1B:
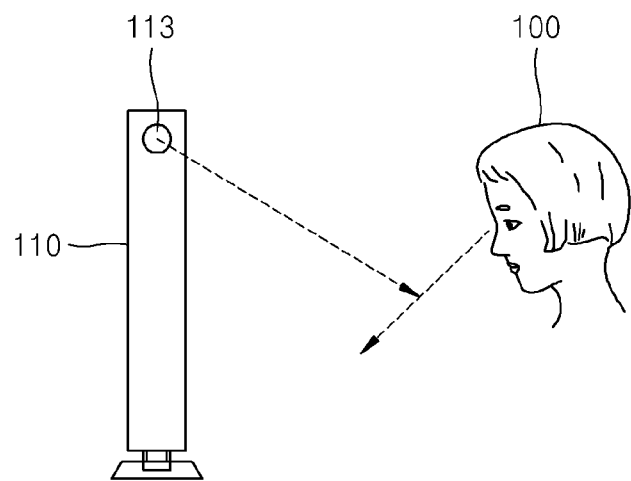

FIGS. 1A and 1B illustrate a sense-providing system according to an embodiment of the present invention.

Referring to FIG. 1A, the sense-providing system includes a sensory information-providing device and a sense-providing device that is provided to a user 100. A display device 110 as the sensory information-providing device includes a screen 111, a communication module 112 communicating with the sense-providing device, and a camera 113 for detecting a viewing direction of a user. A tactile device 120 as the sense-providing device provides tactile stimuli to the user 100, and includes a communication module communicating with the display device 110.

The tactile device 120 includes a sensor for detecting a motion of the tactile device 120, to generate motion information. The tactile device 120 then transmits the motion information to the display device 110. Based on the motion information, the display device 110 detects an object, which corresponds to a position of the tactile device 120, on the screen 111. The display device 110 then extracts tactile information corresponding to the detected object, and transmits the tactile information to the tactile device 120 through the communication module 112. The tactile device 120 outputs a tactile sense corresponding to the tactile information, to the user 100.

Referring to FIG. 1B, the camera 113 of the display device 110 detects viewing direction information about a viewing direction of the user 100. In FIG. 1B, the display device 110 detects an object based on the viewing direction information and motion information, unlike in FIG. 1A. Accordingly, the object can be more accurately detected.

Figure 2:
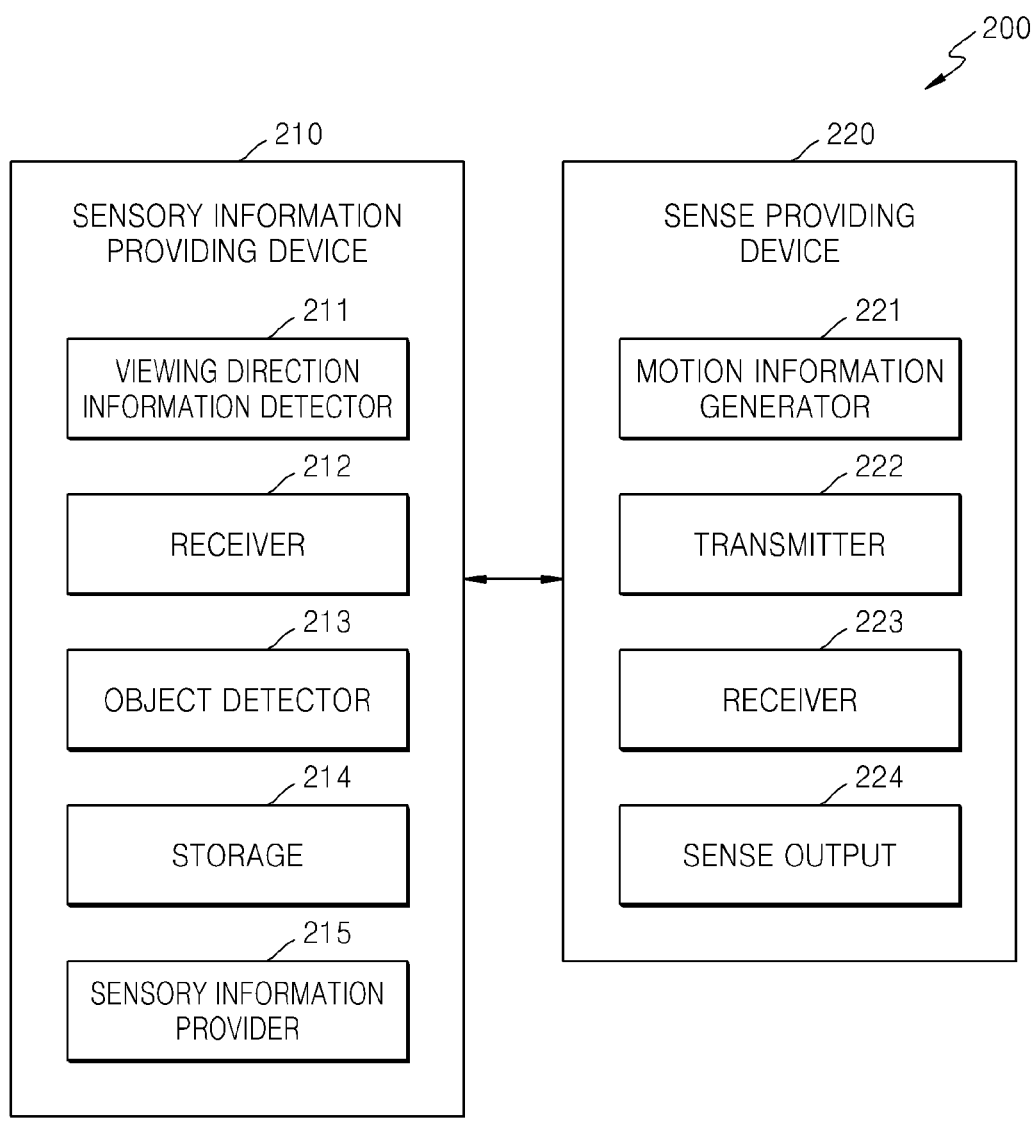
FIG. 2 illustrates a sense-providing system according to an embodiment of the present invention.

FIG. 2 illustrates a sense-providing system 200 according to an embodiment of the present invention.

The sense-providing system 200 includes a sensory information-providing device 210 and a sense-providing device 220. The sensory information-providing device 210 includes a viewing direction information detector 211, a receiver 212, an object detector 213, a storage 214, and a sensory information provider 215. The sense-providing device 220 includes a motion information generator 221, a transmitter 222, a receiver 223, and a sense output 224. The sensory information-providing device 210 may be provided to a display device (not shown) such as a television, but the present invention is not limited thereto. The sense-providing device 220 may be any device that is installed on a user's hand to provide various stimuli such as pressure, temperature, and vibration. The sense-providing device 220 may include a polymer glove. The receiver 212 and the sensory information provider 215 correspond to the communication module 112 of the sensory information-providing device of FIG. 1. The transmitter 222 and the receiver 223 correspond to the communication module of the sense-providing device of FIG. 1.

The viewing direction information detector 211 detects information about a viewing direction of a user. The viewing direction information detector 211 detects an eye of a user watching a display device including the sensory information-providing device 210, to sense an area at which the user stares on a screen of the display device, thereby detecting a viewing direction of the eye. The viewing direction information detector 211 may be a camera or a sensor for detecting information about a viewing direction.

The motion information generator 221 generates information about motions of the sense-providing device 220. For example, when the sense-providing device 220 installed on a user's hand approaches an object on the screen of the display device, the motion information generator 221 generates motion information such as moving direction and distance of the sense-providing device 220. The motion information generator 221 may include a geomagnetic sensor that analyzes flows of a magnetic field generated from the Earth to sense a compass direction, and an acceleration sensor that senses acceleration of a moving object. The motion information generator 221 uses a motion start signal as a reference to measure a motion. The sense-providing device 220 may receive the motion start signal from the sensory information-providing device 210, or may generate the motion start signal for itself. When the sense-providing device 220 receives or generates the motion start signal, the motion information generator 221 sets a position of the sense-providing device 220 as the motion start signal, and measures a motion of the sense-providing device 220 to generate motion information.

The transmitter 222 of the sense-providing device 220 transmits the generated motion information to the receiver 212 of the sensory information-providing device 210.

The object detector 213 detects an object corresponding to the position of the sense-providing device 220, from an image, based on the motion information received by the receiver 212 of the sensory information-providing device 210. The object detector 213 may measure a distance between a user and the display device by using information about a depth of an object in a 3D image. That is, the object detector 213 may detect a position of the sense-providing device 220, and an object corresponding to the position, based on motion information. When the viewing direction information detector 211 detects information about a viewing direction of a user, the object detector 213 may detect an object, based on the information and motion information. Due in part to the information about the viewing direction of the user, a position of the sense-providing device 220 is accurately detected.

The storage 214 stores sensory information corresponding to objects, such as tactile information. For example, when an object is ice, the storage 214 may store, in part, sensory information with respect to temperature.

The sensory information provider 215 reads sensory information corresponding to a detected object, from the storage 214, and transmits the sensory information to the receiver 223 of the sense-providing device 220.

The sense output 224 outputs a sense to a user on which the sense-providing device 220 is installed, based on sensory information received by the receiver 223 of the sense-providing device 220.

FIG. 3 illustrates a sensory information-providing method according to an embodiment of the present invention.

Referring to FIG. 3, in step 310, a sensory information-providing device detects viewing direction information about a viewing direction of a user. The sensory information-providing device detects an eye of the user watching a display device including the sensory information-providing device, to sense an area at which the user stares on a screen of the display device, thereby detecting a viewing direction of the eye. The sensory information-providing device detects the viewing direction information with a camera or a sensor for detecting information about a viewing direction. Alternatively, step 310 may be omitted.

In step 320, the sensory information-providing device receives motion information about a motion of a sense-providing device. Specifically, the sensory information-providing device receives information about a motion start position where the sense-providing device starts to move, and receives motion information from the motion start position. The motion information may be used to determine a distance between the sense-providing device and the screen of the display device, which will be described in detail with reference to FIG. 4.

In step 330, the sensory information-providing device detects an object corresponding to a position of the sense-providing device, from an image, based on the viewing direction information and the motion information. The sensory information-providing device may measure a distance between the user and the display device by using information about a depth of the object in a 3D image. That is, the sensory information-providing device may detect a current position of the sense-providing device and the object corresponding to the current position, based on the viewing direction information and the motion information. If step 310 is removed, the sensory information-providing device may detect the object, based on only the motion information.

In step 340, the sensory information-providing device transmits sensory information, stored in the sensory information-providing device and corresponding to the detected object, to the sense-providing device.

FIG. 4 illustrates a sense-providing method according to an embodiment of the present invention.

Referring to FIG. 4, in step 410, a sense-providing device generates motion information according to a motion of the device. For example, when the sense-providing device installed on a user's hand approaches an object on a screen of a display device, the sense-providing device generates motion information such as moving direction and distance of the sense-providing device. The sense-providing device may include a geomagnetic sensor that analyzes flows of a magnetic field generated from the Earth to sense a compass direction, and an acceleration sensor that senses acceleration of a moving object. The sense-providing device uses a motion start signal as a reference to measure a motion. The sense-providing device may receive the motion start signal from a sensory information-providing device, or may generate the motion start signal for itself. When the sense-providing device receives or generates the motion start signal, the sense-providing device sets a position of the sense-providing device as the motion start signal, and measures a motion of the sense-providing device to generate motion information.

In step 420, the sense-providing device transmits the generated motion information to the sensory information-providing device.

In step 430, the sense-providing device receives sensory information corresponding to an object corresponding to a position of the sense-providing device, in an image, based on the motion information. Since the object and the sensory information corresponding to the object in FIG. 4 are the same as those in FIG. 3, a description thereof will be omitted.

In step 440, the sense-providing device provides a user with a sense (e.g., a tactile sense such as pressure, temperature, and vibration) corresponding to the object.

FIG. 5 illustrates a method of receiving sensory information from a sensory information-providing device and providing a sense from a sense-providing device, according to an embodiment of the present invention. Referring to FIG. 5, the methods of FIGS. 3 and 4 are illustrated with respect to a system. Since terms and processes in FIG. 5 are the same as those in FIGS. 3 and 4, a description thereof will be omitted.

In step 501, a sensory information-providing device detects viewing direction information about a viewing direction of a user.

In step 502, a sense-providing device generates motion information according to a motion of the device, by using at least one of a geomagnetic sensor and an acceleration sensor, which constitute the sense-providing device. The sense-providing device may include a polymer glove.

In step 503, the sense-providing device transmits the motion information to the sensory information-providing device.

In step 504, the sensory information-providing device detects an object corresponding to a position of the sense-providing device, from an image, based on the viewing direction information and the motion information from the sense-providing device. If step 501 is omitted, the sensory information-providing device detects the object, based on only the motion information.

In step 505, the sensory information-providing device transmits sensory information corresponding to the detected object, to the sense-providing device.

In step 506, the sense-providing device provides a user with a sense corresponding to the transmitted sensory information.

As described above, the sensory information-providing method, the sense-providing method, and the method of receiving sensory information from the sensory information-providing device and providing a sense from the sense-providing device may be realized with computer readable codes on a computer readable recording medium. The computer readable recording medium is any data storage device that can store data which can be thereafter read by a computer system. Examples of the computer readable recording medium include Read-Only Memory (ROM), Random Access Memory (RAM), Compact Disc-ROM (CD-ROM), magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to embodiments thereof, it will be understood by those of ordinary skill in the art that various changes in form and details may be made therein without departing from the spirit and scope of the present invention as defined by the following claims. The embodiments herein should be considered in descriptive sense only, and not for purposes of limitation. Therefore, the scope of the present invention is defined not by the detailed description of the present invention but by the following claims, and all differences within the scope will be construed as being included in the present invention.

What is claimed is:

1. A method comprising:
    displaying a plurality of objects in an image to a user via a display operatively coupled with an electronic device;

identifying an object from the plurality of objects in the image based at least in part on information related to the user, wherein the information related to the user comprises viewing direction information corresponding to a viewing direction of the user; and assigning, using one or more processors, first sensory information to the object when the object is a first object, and second sensory information to the object when the object is a second object, the first sensory information corresponding to a first physical effect and the second sensory information corresponding to a second physical effect.

2. The method of claim 1, wherein the first physical effect comprises at least one of pressure, temperature, vibration, air, motion, liquid, smell, or light, and wherein the second physical effect comprises at least one of pressure, temperature, vibration, air, motion, liquid, smell, or light.

3. The method of claim 1, wherein assigning the first sensory information and the second sensory information comprises:

transmitting, by the electronic device, corresponding sensory information of the first sensory information and the second sensory information to another electronic device that is separate from the electronic device, wherein the first physical effect or the second physical effect corresponds to the transmitted sensory information to be provided to the user via the another electronic device.

4. The method of claim 1, wherein the information related to the user further comprises gesture information corresponding to a gesture of the user.

5. The method of claim 4, wherein the gesture information is received from another electronic device wearable by the user.

6. The method of claim 5, wherein the first object corresponds to a first position of the another electronic device relative to the image, and wherein the second object corresponds to a second position of the another electronic device relative to the image.

7. An apparatus comprising:

a display configured to display a plurality of objects in an image to a user;

an object detector configured to identify an object from the plurality of objects in the image based at least in part on information related to the user, wherein the information related to the user comprises viewing direction information corresponding to a viewing direction of the user; and a sensory information provider configured to assign first sensory information to the object if the object is a first object, and second sensory information to the object if the object is a second object, the first sensory information corresponding to a first physical effect and the second sensory information corresponding to a second physical effect.

8. The apparatus of claim 7, wherein the first physical effect comprises at least one of pressure, temperature, vibration, air, motion, liquid, smell, or light, and wherein the second physical effect comprises at least one other of pressure, temperature, vibration, air, motion, liquid, smell, or light.

9. The apparatus of claim 7, wherein the sensory information provider is further configured to:

transmit the sensory information to an electronic device, which is separate from the apparatus and provides the first physical effect or the second physical effect to the user.

10. The apparatus of claim 7, wherein the information related to the user further comprises motion information corresponding to a motion of the user, and wherein the motion information is received from an electronic device worn by the user.

11. The apparatus of claim 10, wherein the electronic device comprises a glove.

12. The apparatus of claim 10, wherein the object detector is further configured to:

receive, as at least part of the information related to the user, position information corresponding to a position at which the electronic device starts to move in relation with the image, and motion information corresponding to a motion of the electronic device from the position.

13. The apparatus of claim 7, wherein the first object corresponds to a first viewing direction of the user relative to the image, and wherein the second object corresponds to a second viewing direction of the user relative to the image.

14. An apparatus comprising:

a motion information generator configured to obtain gesture information corresponding to a gesture of the apparatus relative to a plurality of objects in an image displayed to a user via an electronic device that is separate from the apparatus and is configured to obtain viewing direction information corresponding to a viewing direction of the user, wherein the gesture information and the viewing direction information identify an object from the plurality of objects in the image; and a sense output device configured to provide the user with a first physical effect if the object is a first object, and a second physical effect if the object is a second object.

15. The apparatus of claim 14, further comprising:

a transmitter configured to transmit the gesture information to the electronic device.

16. The apparatus of claim 14, further comprising:

a receiver configured to receive, from the electronic device, sensory information representing at least one of the first physical effect and the second physical effect.

17. The apparatus of claim 14, wherein the first object corresponds to a first position of the apparatus, and wherein the second object corresponds to a second position of the apparatus.

18. The apparatus of claim 14, wherein the first physical effect comprises at least one of pressure, temperature, vibration, air, motion, liquid, smell, or light, and wherein the second physical effect comprises at least one other of pressure, temperature, vibration, air, motion, liquid, smell, or light.

* * * * *